UNITED STATES PATENT OFFICE.

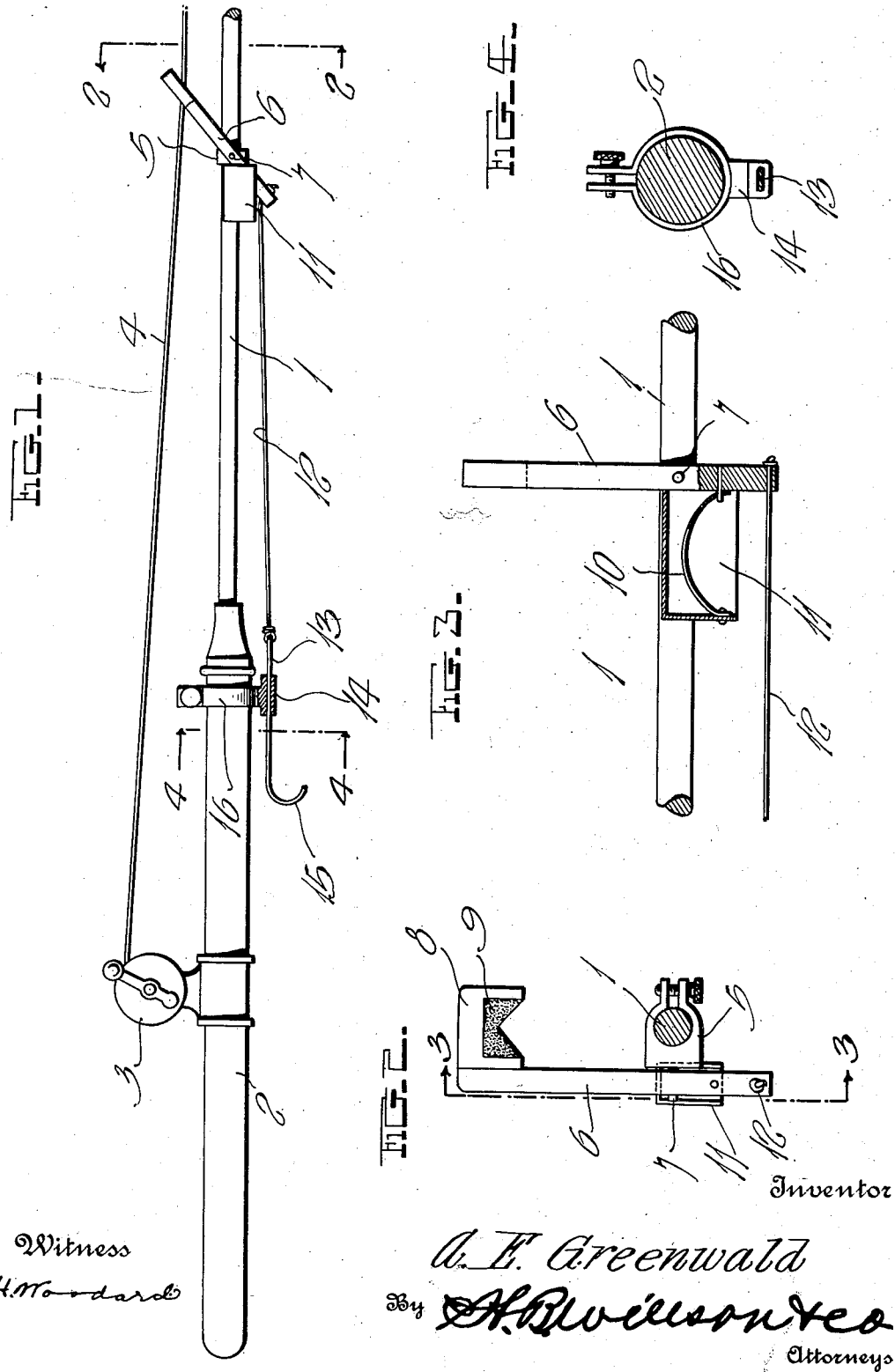

ARTHUR E. GREENWALD, OF CHIPPEWA FALLS, WISCONSIN.

FISHING-ROD ATTACHMENT.

1,251,221.  Specification of Letters Patent.  Patented Dec. 25, 1917.

Application filed May 3, 1917. Serial No. 166,222.

*To all whom it may concern:*

Be it known that I, ARTHUR E. GREENWALD, a citizen of the United States, residing at Chippewa Falls, in the county of Chippewa and State of Wisconsin, have invented certain new and useful Improvements in Fishing-Rod Attachments; and I do declare the following to be a full, clear, and exact description of the invention, such as will enable others skilled in the art to which it appertains to make and use the same.

My invention has for its object to provide a simple and inexpensive attachment for fishing rods so constructed as to wipe all water from the line as it is reeled in, thus preventing the water from dripping upon the fisherman and permitting him to wear gloves or mittens in cold weather without the danger of having them freeze on his hands.

With the foregoing general object in view, the invention resides in the novel construction and unique combinations of parts to be hereinafter fully described and claimed, the descriptive matter being supplemented by the accompanying drawing which forms a part of this specification and in which:—

Figure 1 is a side elevation of a fishing rod equipped with the invention;

Fig. 2 is a transverse section on the plane of the line 2—2 of Fig. 1;

Fig. 3 is a vertical section through the spring housing on the plane of the line 3—3 of Fig. 2; and Fig. 4 is a transverse section on the plane designated by the line 4—4 of Fig. 1.

In the drawing above briefly described the numeral 1 designates a fishing rod having a handle 2, reel 3 and line 4, the aim of the present invention being to remove all water from said line as it is wound upon the reel. A clamp 5 is secured on the rod 1 a suitable distance in advance of the handle 2, and a forwardly swinging arm 6 is pivoted between its ends to said clamp as shown at 7, said arm having a hook-shaped end 8 in which a wiping device 9 is mounted, said device being preferably constructed of sponge rubber although it might well be formed of felt or any other suitable material. A spring 10 normally exerts its tension to hold the arm 6 in a vertical position so that the device 9 does not contact with the line 4, it being intended, however, that the arm 6 may be thrown forwardly at will so that the line will engage the wiping device as it is reeled in. The spring 10 is preferably located in a housing 11 secured rigidly to the clamp 5 in any preferred manner.

A wire, cord, or other suitable connector 12 is fastened to the end of the arm 6 remote from the device 9, said connector leading to a slide 13 mounted in a suitable guide 14 and having a hooked operating handle 15 to be drawn rearwardly by the forefinger of the fisherman's left hand while using his right hand to wind the reel. It will be obvious that this operation of the slide 13 will move the wiping device to operative position so that the water will be removed from the line 4 before it is wound on the reel.

The guide 14 is shown mounted on a clamp 16 which embraces the handle 2, but it is to be understood that said guide as well as the arm 6 could well be mounted in any other appropriate manner. I prefer the use of clamps, however, since they render the device attachable to numerous kinds of fishing rods.

By removing the moisture from the line in the manner described, it is prevented from dripping from the reel onto the fisherman, thus making it possible for him to use gloves or mittens without danger of the same becoming soaked and frozen in cold weather. Furthermore, the life of the reel is prolonged since it is not subjected to the action of the water and rotting of the line is prevented to a great extent. Another advantage is that back lashing or snarling of the line is prevented.

The advantages pointed out are best attained by the construction shown and described and this construction therefore constitutes the preferred form of the device. I wish it understood, however, that within the scope of the invention as claimed, numerous minor changes may be made without sacrificing the principal advantages.

I claim:

1. In a fishing line wiping device, a wiping member and means for mounting it on a fishing rod, said member being normally positioned above the line, and a manual control for lowering said wiping member against the line.

2. A device of the class described comprising a clamp for application to a fishing rod, a swinging arm mounted on said clamp and having a line wiping device, a second clamp for application to the rod, a sliding control device mounted on said second clamp, and a connection between said control device and said arm for actuating the latter upon movement of the former, whereby said wiping device may be brought into contact with the line.

In testimony whereof I have hereunto set my hand in the presence of two subscribing witnesses.

ARTHUR E. GREENWALD.

Witnesses:
C. H. DEAN,
L. F. GREENWALD.